US009527966B2

(12) United States Patent
Urushihara et al.

(10) Patent No.: US 9,527,966 B2
(45) Date of Patent: Dec. 27, 2016

(54) METHOD FOR PRODUCING MASTERBATCHES

(71) Applicant: ADEKA CORPORATION, Tokyo (JP)

(72) Inventors: Tsuyoshi Urushihara, Saitama (JP); Yota Tsuneizumi, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 14/367,115

(22) PCT Filed: Dec. 7, 2012

(86) PCT No.: PCT/JP2012/081841
§ 371 (c)(1),
(2) Date: Jun. 19, 2014

(87) PCT Pub. No.: WO2013/094436
PCT Pub. Date: Jun. 27, 2013

(65) Prior Publication Data
US 2014/0350139 A1    Nov. 27, 2014

(30) Foreign Application Priority Data

Dec. 20, 2011   (JP) .................................. 2011-278864

(51) Int. Cl.
| C08J 3/22 | (2006.01) |
| C08J 3/20 | (2006.01) |
| C08K 5/45 | (2006.01) |
| B29C 47/00 | (2006.01) |
| B29C 47/40 | (2006.01) |
| C08K 5/098 | (2006.01) |
| C08K 5/43 | (2006.01) |
| B29K 503/04 | (2006.01) |
| B29K 509/00 | (2006.01) |
| B29B 7/00 | (2006.01) |
| B29K 67/00 | (2006.01) |
| B29K 309/08 | (2006.01) |

(52) U.S. Cl.
CPC .............. *C08J 3/22* (2013.01); *B29C 47/0007* (2013.01); *B29C 47/404* (2013.01); *C08J 3/201* (2013.01); *C08J 3/203* (2013.01); *C08J 3/226* (2013.01); *C08K 5/45* (2013.01); *B29B 7/00* (2013.01); *B29K 2067/00* (2013.01); *B29K 2309/08* (2013.01); *B29K 2503/04* (2013.01); *B29K 2509/00* (2013.01); *C08J 2367/02* (2013.01); *C08J 2467/02* (2013.01); *C08K 5/098* (2013.01); *C08K 5/43* (2013.01)

(58) Field of Classification Search
CPC ..................................... C08K 5/45; C08J 3/22
USPC .................. 523/351; 524/168, 392, 394, 605
See application file for complete search history.

(56) References Cited

U.S. PATENT DOCUMENTS

| 5,308,892 A | 5/1994 | Zickler et al. |
| 8,017,678 B2 | 9/2011 | Horikoshi et al. |
| 2003/0135015 A1 | 7/2003 | Fujimaki et al. |
| 2007/0213439 A1* | 9/2007 | Wolters et al. ............... 524/321 |
| 2009/0082496 A1* | 3/2009 | Tammaji et al. ............. 524/115 |
| 2011/0015319 A1 | 1/2011 | Nomura |

FOREIGN PATENT DOCUMENTS

| EP | 2 484 725 A1 | 8/2012 |
| JP | 2002-296837 A | 10/2002 |
| JP | 2003-160723 A | 6/2003 |
| JP | 2010-43140 A | 2/2010 |
| TW | 593418 B | 6/2004 |
| WO | WO 2007/129527 A1 | 11/2007 |
| WO | WO 2008/038465 A1 | 4/2008 |
| WO | WO 2009/116499 A1 | 9/2009 |
| WO | WO 2010/104103 A1 | 9/2010 |
| WO | WO 2011/040337 A1 | 4/2011 |

OTHER PUBLICATIONS

International Search Report, issued in PCT/JP2012/081841, dated Mar. 5, 2013.
European Search Report dated Jul. 16, 2015 for EP Application No. 12860601.9.
Taiwanese Office Action mailed Nov. 17, 2015 for TW Application No. 10421551190.
Taiwanese Office Action mailed Nov. 17, 2015 for TW Application No. 101148317.

* cited by examiner

*Primary Examiner* — Edward Cain
(74) *Attorney, Agent, or Firm* — Birch, Stewart, Kolasch & Birch, LLP

(57) ABSTRACT

The method of producing a masterbatch according to the present invention is a method of producing a masterbatch in which a metal salt compound is incorporated into a polyester resin, the method being characterized by comprising: a first step of obtaining a kneaded product by feeding the polyester resin and the metal salt compound to an extruder and melt-kneading the polyester resin and the metal salt compound; and a second step of, while continuing kneading after the first step, further feeding the polyester resin to the extruder and kneading the resulting mixture, wherein, in the first step, the polyester resin and the metal salt compound are fed at such a mass ratio that the amount of the metal salt compound is not more than twice the amount of the polyester resin; the total amount of the polyester resin fed in the first and second steps and the metal salt compound fed in the first step is, in terms of mass ratio, in the range of 2 to 20 times the total amount of the polyester resin and the metal salt compound that are fed in the first step.

5 Claims, No Drawings

METHOD FOR PRODUCING MASTERBATCHES

TECHNICAL FIELD

The present invention relates to a method of producing a masterbatch in which a metal salt compound is blended in a polyester resin. More particularly, the present invention relates to a production method which comprises: a first step of melt-kneading a polyester resin and a metal salt compound; and a step of further adding the polyester resin to a kneaded product obtained in the first step and kneading the resulting mixture.

BACKGROUND ART

As polyester resins that are obtained by polycondensation of a polycarboxylic acid and a polyhydric alcohol, for example, polyethylene terephthalate, polytrimethylene terephthalate, polybutylene terephthalate, polyethylene naphthalate and polybutylene terephthalate are known. Particularly, polyethylene terephthalate is a resin which has excellent transparency, heat resistance, chemical resistance, hygienic properties, staining properties, economic efficiency and the like; therefore, it is widely used in, for example, fibers; film applications; beverage containers (PET bottles) of carbonated drinks, juice drinks, mineral waters and the like; containers of cosmetic and medical products; detergent and shampoo containers; electrophotographic toners; and packaging materials such as food packages, pharmaceutical packages and wrapping materials.

However, despite being crystalline resins, polyester resins, particularly polyethylene terephthalate, have an extremely slow crystallization rate; therefore, the range of molding conditions applicable thereto is very narrow and it is thus difficult to improve the processing cycle, so that the use of a polyester resin as a molding material is limited. In addition, since a molded article obtained by molding a polyester resin has a low thermal deformation temperature, there is a problem that the serviceable temperature thereof is limited.

As a method of improving the crystallization rate of a polyester resin, for example, a method of adding a nucleating agent is employed. Examples of such a nucleating agent include polymers, minerals, metal salts of organic or inorganic acids, glass powders and metal powders, more specifically, olefins such as low-density polyethylenes, high-density polyethylenes and linear low-density polyethylenes; minerals (clays) such as graphite, talc and kaolin; metal oxides such as zinc oxide, alumina and magnesium oxide; silica compounds such as silica, calcium silicate and magnesium silicate; metal carbonates such as magnesium carbonate, calcium carbonate, sodium carbonate and potassium carbonate; barium sulfate; calcium sulfate; sodium benzoate; aluminum p-tert-butyl benzoate; aromatic metal phosphates; dibenzylidene sorbitol; sulfonamide compounds; and sulfonimide compounds. For example, in Patent Documents 1 to 4, the present inventions have proposed to incorporate a metal salt of a sulfonamide compound or a metal salt of a sulfonimide compound as a nucleating agent of a polyester resin.

RELATED ART DOCUMENTS

Patent Documents

Patent Document 1: WO2007/129527
Patent Document 2: WO2008/038465
Patent Document 3: WO2009/116499
Patent Document 4: WO2011/040337

SUMMARY OF THE INVENTION

Problems to be Solved by the Invention

As a method of blending and molding a nucleating agent with a polyester resin, for example, a method in which a polyester resin and a nucleating resin are blended in advance using a Henschel mixer, a tumbler mixer or the like and the resulting mixture is fed to an extruder using a feeder or a method in which a polyester resin and a nucleating agent are separately fed to an extruder using quantitative feeders is employed. These methods have a problem in that the nucleating agent and polyester resin are in a powder form and thus blown up into the air during operation to adversely affect the working environment, as well as a problem of contamination. Therefore, in recent years, the use of a method in which a masterbatch containing a nucleating agent is added is becoming the main trend.

However, when a large amount of a metal salt compound is added to a polyester resin to produce a masterbatch, there are such problems that, due to a considerable reduction in the molecular weight of the polyester resin, granulation of the resulting masterbatch cannot be granulated and the masterbatch may be colored to deteriorate the outer appearance of the resulting molded article. Particularly, in conventional production methods, it is difficult to produce a masterbatch which does not impair the outer appearance of the resulting molded article by incorporating not less than 2% by mass of a metal salt compound into a polyester resin and, in some cases, it is even difficult to produce a masterbatch.

Therefore, an object of the present invention is to provide a method of producing a masterbatch by which a masterbatch which contains a metal salt compound but has an improved moldability with little coloration can be obtained.

Means for Solving the Problems

In view of the above-described circumstances, the present inventors intensively studied to discover that the above-described problems can be solved by employing a production method which comprises: a first step of kneading a polyester resin and a metal salt compound; and a second step of adding and kneading the polyester resin with a kneaded product obtained in the first step, thereby completing the present invention.

That is, the method of producing a materbatch according to the present invention is a method of producing a masterbatch in which a metal salt compound is incorporated into a polyester resin, the method comprising: a first step of obtaining a kneaded product by feeding the polyester resin and the metal salt compound to an extruder and melt-kneading the polyester resin and the metal salt compound; and a second step of, while continuing kneading after the first step, further feeding the polyester resin to the extruder and kneading the resulting mixture, wherein, in the first step, the polyester resin and the metal salt compound are fed at such a mass ratio that the amount of the metal salt compound is not more than twice the amount of the polyester resin; the total amount of the polyester resin fed in the first and second steps and the metal salt compound fed in the first step is, in terms of mass ratio, in the range of 2 to 20 times the total amount of the polyester resin and the metal salt compound that are fed in the first step; the processing temperature in the first step is in the range of 20° C. to 80° C. higher than the melting point of the polyester resin; and the processing temperature in the second step is in the range of 0° C. to 50° C. higher than the melting point of the polyester resin.

In the method of producing a masterbatch according to the present invention, it is preferred that the above-described metal salt compound be at least one selected from the group consisting of metal benzoates, aliphatic metal carboxylates, metal salts of sulfonamide compounds and metal salts of sulfonimide compounds.

Further, in the method of producing a masterbatch according to the present invention, it is preferred that the above-described polyester resin be at least one selected from the group consisting of polyethylene terephthalate, polytrimethylene terephthalate, polybutylene terephthalate, polyethylene naphthalate and polybutylene naphthalate.

Still further, in the method of producing a masterbatch according to the present invention, it is preferred that, in the above-described second step, the polyester resin be fed to the kneaded product obtained in the first step by a side feeder.

The masterbatch according to the present invention is obtained by the above-described method of producing a masterbatch and has an intrinsic viscosity of not less than 0.25.

It is preferred that the masterbatch according to the present invention comprise 2 to 20 parts by mass of the metal salt compound with respect to 100 parts by mass of the polyester resin.

The molded article according to the present invention is produced by molding any one of the above-described masterbatches.

Effects of the Invention

By the present invention, a method of producing a masterbatch which can yield a masterbatch that contains a metal salt compound at a high concentration but has an improved moldability with little coloration can be provided. In addition, by incorporating a masterbatch obtained by the present invention into a polyester resin and molding the resultant, a molded article in which occurrence of defective outer appearance is inhibited can be provided.

MODE FOR CARRYING OUT THE INVENTION

The metal of the metal salt compound used in the present invention may be, for example, a metal selected from lithium, potassium, sodium, magnesium, calcium, aluminium, strontium, titanium, manganese, iron, zinc, silicon, zirconium, yttrium and barium. It is preferably potassium, lithium or sodium since excellent effect of promoting crystallization of a polyester resin can be attained, and it is particularly preferably sodium.

The metal salt compound used in the present invention is not particularly restricted, and examples thereof include sulfates such as calcium sulfate and barium sulfate; inorganic phosphates such as calcium phosphate; organic phosphates such as metal salts of aromatic oxysulfonic acids, magnesium salts of organophosphorus compounds and zinc salts of organophosphorus compounds; inorganic silicates such as calcium silicate and magnesium silicate; aliphatic metal carboxylates such as sodium monocarboxylate, lithium monocarboxylate, barium monocarboxylate, magnesium monocarboxylate, calcium monocarboxylate, sodium stearate, sodium montanate, calcium montanate, sodium adipate, sodium carbonate and magnesium carbonate; alicyclic metal carboxylates such as 2-sodium-bicyclo[2.2.1] heptane-2,3-dicarboxylate; metal benzoates such as aluminum 4-tert-butyl benzoate, sodium benzoate, potassium benzoate and calcium benzoate; metal phosphates such as sodium-bis(4-tert-butylphenyl)phosphate, sodium-2,2'-methylenebis(4,6-di-tert-butylphenyl)phosphate and lithium-2,2'-methylenebis(4,6-di-tert-butylphenyl)phosphate; metal salts of sulfonamide compounds such as metal salts of benzene sulfonamide, metal salts of toluene-4-sulfonamide, metal salts of N-phenyl-benzene sulfonamide and metal salts of N-phenyl-4-methyl-benzene sulfonamide; metal salts of sulfonimide compounds such as metal salts of 1,2-benzisothiazol-3(2H)-one-1,1-dioxide; and polycaprolactones, polyglycols, polyolefins modified with maleic acid or the like, nylon 6, high-melting-point polyester resins and polyester oligomers, which are converted into metal salts.

Thereamong, metal benzoates, aliphatic metal carboxylates, metals salts of sulfonamide compounds and metal salts of sulfonimide compounds are preferred, and metal salts of benzene sulfonamide, metal salts of benzimide compounds, metal salts of toluene-4-sulfonamide, metal salts of N-phenyl-benzene sulfonamide, metal salts of N-phenyl-4-methyl-benzene sulfonamide and metal salts of 1,2-benzisothiazol-3(2H)-one-1,1-dioxide are particularly preferred. More particularly, a metal salt of 1,2-benzisothiazol-3(2H)-one-1,1-dioxide is preferably used. Particular, when a metal salt of 1,2-benzisothiazol-3(2H)-one-1,1-dioxide is used as the metal salt compound, a masterbatch with little coloration can be obtained, and a molded article obtained by blending the materbatch can attain good outer appearance.

According to the production method of the present invention, it is also possible to produce a masterbatch containing the above-described metal salt compound at a concentration of higher than 20% by mass. However, in cases where a masterbatch containing the metal salt compound at a concentration of higher than 20% by mass is added to a polyester resin and the resulting mixture is molded, the metal salt compound may be unevenly distributed and this may lead to irregular molding; therefore, it is preferred to produce a masterbatch containing the metal salt compound within the range of 2 to 20% by mass.

The polyester resin used in the present invention is a polymer synthesized from a polycarboxylic acid monomer and a polyhydric alcohol component by linking these components via ester bond. Preferably, the polyester resin contains an aliphatic dicarboxylic acid, an aromatic dicarboxylic acid or an alkyl ester thereof as a main acid component and ethylene glycol as a main glycol component. In the present invention, examples of the aromatic dicarboxylic acid or alkyl ester thereof include terephthalic acid, isophthalic acid, naphthalenedicarboxylic acid, diphenyldicarboxylic acid and alkyl esters thereof. Further, the polyester resin may also be one which contains other aromatic dicarboxylic acid group, such as a halogenated equivalent the above-described polyester resin. Thereamong, terephthalic acid or dimethyl terephthalate is preferably used, and the amount of thereof in the acid component is usually not less than 75 mol %, preferably not less than 80 mol %, most preferably not less than 90 mol %. These acid components may be used individually, or two or more thereof may be used in combination.

Further, in addition to the above-described compounds, as a copolymerizable component, an aliphatic dicarboxylic acid such as adipic acid, sebacic acid, succinic acid or oxalic acid, or an alkyl ester thereof may be used as well. Moreover, a tri- or higher functional carboxylic acid such as trimellitic acid or an acid anhydride such as trimellitic anhydride may also be used in a small amount. Examples of the alkyl ester of an aromatic dicarboxylic acid to be mainly used include methyl esters, and ethyl esters, propyl esters, butyl esters and the like may be used individually, or two or more thereof may be used in combination. The alkyl ester of an aromatic dicarboxylic acid can be arbitrary selected in accordance with the intended purpose thereof.

In the present invention, examples of glycol component other than ethylene glycol include alkylene glycols such as propylene glycol, 1,4-butane diol, 1,6-hexane diol, neopentyl glycol, decamethylene glycol, cyclohexane dimethanol, poly(oxy)ethylene glycol, polytetramethylene glycol and polymethylene glycol. These glycol components may be used individually, or two or more thereof may be used in combination, and the glycol component other than ethylene glycol can be arbitrarily selected in accordance with the intended purpose thereof. Further, a small amount of a polyhydric alcohol component such as glycerin may also be used and, alternatively, a small amount of an epoxy compound may be used.

The ratio of ethylene glycol in the glycol component is preferably not less than 75 mol %, more preferably not less than 80 mol %, particularly preferably not less than 90 mol %.

Examples of the above-described suitable polyester resin include polyalkylene terephthalates such as polyethylene terephthalate, polybutylene terephthalate and polycyclohexanedimethylene terephthalate; and polyalkylene naphthalates such as polyethylene naphthalate and polybutylene naphthalate.

The polyester resin according to the present invention may be a copolymer of a plurality of polyester resins or a modified polyester. Alternatively, the polyester resin according to the present invention may be a polymer alloy of the above-described suitable polyester resin and other resin described below. The term "polymer alloy" used herein refers to a polymeric multi-component system which may be a block copolymer obtained by copolymerization or a polymer blend obtained by mixing or the like of polymers.

Examples of the above-described other resin include a wide range of polyester resins including polyether ester resins obtained by copolymerizing a polyester constituent with other acid component and/or glycol component (e.g., an acid component such as isophthalic acid, adipic acid, sebacic acid, glutaric acid, diphenylmethane dicarboxylic acid or dimer acid and/or a glycol component such as hexamethylene glycol, bisphenol A or neopentyl glycol alkylene oxide adduct); degradable aliphatic polyesters such as polyhydroxybutyrate, polycaprolactone, polybutene succinate, polyethylene succinate, polylactic acid resin, polymalic acid, polyglycolic acid, polydioxanone and poly(2-oxetanone); aromatic polyester/polyether block copolymers; aromatic polyester/polylactone block copolymers; and polyallylates.

Further, in the present invention, the polyester resin contains a polyester oligomer. As the polyester oligomer, any known compound can be used without any particular restriction.

In the present invention, among the above-described polyester resins, one having a melting point of 200° C. to 300° C. is particularly preferably used.

In the first step, the polyester resin and the metal salt compound are fed to an extruder at such a mass ratio that the amount of the metal salt compound is not more than twice the amount of the polyester resin. When the amount of the metal salt compound is more than twice the amount of the polyester resin, the effects of the present invention may not be exerted. The mass ratio of the metal salt compound is more preferably in the range of 0.1 to 2 times, still more preferably 0.2 to 2 times. When the mass ratio of the metal salt compound is less than 0.1 times, the effect of a nucleating agent is impaired when the masterbatch is added to a polyester resin, so that the masterbatch must be added in a large amount, which is economically disadvantageous.

The polyester resin to be fed in the second step may be the same as or different from the polyester resin used in the first step. Alternatively, the polyester resin to be fed in the second step may be one which contains the same polyester resin as the one used in the first step. It is noted here, however, that the polyester resin to be fed in the second step does not contain any polyester oligomer. With respect to the total amount of the polyester resin and the metal salt compound that are fed in the first step, the total amount of the polyester resin and the metal salt compound that are fed in the first step and the polyester resin fed in the second step is, in terms of mass ratio, in the range of preferably 2 to 20 times, particularly preferably 2 to 10 times. When it is more than 20 times, the distribution of a nucleating agent in the polyester resin may be uneven in the resulting masterbatch. In addition, depending on the amount of the metal salt compound, the effect of a nucleating agent may impaired when the masterbatch is added to a polyester resin, so that the masterbatch may have to be added in a large amount, which is economically disadvantageous. Meanwhile, when the total amount of the polyester resin and the metal salt compound that are fed in the first step and the polyester resin fed in the second step is less than twice the total amount of the polyester resin and the metal salt compound that are fed in the first step, the effects of the present invention may not be exerted and it may become unable to granulate the resulting masterbatch. Further, it is preferred that no metal salt compound be fed in the second step; however, a metal salt compound may be fed in the second step in such an amount that does not impair the effects of the present invention.

In the first step of the production method according to the present invention, as a method of feeding the polyester resin and the metal salt compound to an extruder, a method in which the polyester resin and the metal salt compound are mixed in advance and then fed, or a method in which they are fed separately using two or more quantitative feeders may be employed.

It is preferred that the processing temperature at which the polyester resin and the metal salt compound are melt-kneaded in the first step be adjusted in accordance with the amount of the metal salt compound to be fed. This processing temperature is preferably not lower than the melting point of the polyester resin and in such a range where coloration due to thermal decomposition of the polyester resin does not occur. Usually, it is desired that the processing temperature be 20° C. to 80° C. higher than the melting point of the polyester resin. The melting point of the polyester resin can be measured by DSC under a nitrogen atmosphere at a heating rate of 10° C./10 min. When the ratio (mass ratio) of the metal salt compound with respect to the polyester resin is 0.15 (15% by mass) or less, in order to avoid thermal decomposition of the polyester resin, it is preferred that the processing temperature be in the range of 20° C. to 40° C. higher than the melting point of the polyester resin. Meanwhile, when the ratio (mass ratio) of the metal salt compound with respect to the polyester resin is higher than 0.15 (15% by mass), the processing temperature is preferably in the range of 30° C. to 80° C. higher than the melting point of the polyester resin.

Examples of the method of feeding the polyester resin in the second step of the production method according to the present invention include the same methods as those exemplified for the first step.

In the second step, the kneading is preferably carried out at a temperature as low as possible but not lower than the melting point of the polyester resin fed in the second step. Usually, it is desired that the kneading be carried out at a temperature that is 0° C. to 50° C. higher than the melting point of the polyester resin. Preferably, the kneading is carried out in the temperature range of 0° C. to 20° C. higher than the melting point of the polyester resin fed in the second step. When this processing temperature is higher than the melting point of the polyester resin fed in the second step by more than 50° C., the polyester resin composition obtained after the second step may be colored due to thermal degradation and granulation of the polyester resin composition may become difficult due to a reduction in the molecular weight.

In the first step of the production method according to the present invention, from the standpoint of operability, a biaxial extruder is preferably used for melt-kneading the polyester resin and the metal salt compound. Also for the melt-kneading in the second step, a biaxial extruder is preferably used; however, other known extruder may be used as well. In the production method according to the present invention, two or more extruders may be connected in series and the melt-kneading operation may be carried out in two steps. Alternatively, using a biaxial extruder equipped with a main feeder and one or more side feeders arranged in the downstream of the kneading step, the melt-kneading operations in the first and the second steps of the production method according to the present invention may be carried out continuously.

When a masterbatch obtained by the production method according to the present invention is applied to a polyester resin, the polyester resin and the masterbatch can be kneaded using a kneader, a roll mill, a uniaxial extruder, a biaxial extruder or a multiaxial extruder; however, from the standpoint of the operability, a uniaxial extruder or a biaxial extruder is preferably used. In cases where a biaxial extruder is used, the biaxial extruder can be used regardless of whether the rotation directions of the screws are the same or different. Further, in order to improve the quality of the resultant as well as the working environment, it is preferred that replacement with an inert and/or deaeration via a single-step or multi-step vent be performed.

In the masterbatch obtained by the production method of the present invention, as required, other additive(s) may be blended as well. Examples of the method of blending other additive(s) include a method in which the additive(s) in an amount appropriate for the intended purpose thereof is/are mixed with a polyester resin and the resulting mixture is then melt-kneaded and granulated. The timing of adding other additive(s) is not particularly restricted to be in the first step or the second step. It is preferred that other additive(s) be added and mixed prior to the melt-kneading operation; however, other additive(s) may also be added after the melt-kneading of the second step, followed by molding of the resulting mixture using a molding machine.

Examples of the above-described other additives include a plasticizer, a filler, a phenolic antioxidant, a phosphorus-based antioxidant, a thioester-based antioxidant, an ultraviolet absorber, a hindered amine compound, a heavy metal inactivator, a nucleating agent other than the one used in the present invention, a flame retardant, a metallic soap, a hydrotalcite, a filler, a lubricant, an antistatic agent, a pigment and a dye.

Examples of the above-described plasticizer include polyethylene glycol butyrate, polyethylene glycol isobutyrate, polyethylene glycol di(2-ethylbutyric acid)ester, polyethylene glycol (2-ethylhexylic acid)ester, polyethylene glycol decanoate, dibutoxyethanol adipate, di(butyldiglycol)adipate, di(butylpolyglycol)adipate, di(2-ethylhexyloxyethanol)adipate, di(2-ethylhexyldiglycol)adipate, di(2-ethylhexylpolyglycol)adipate, dioctoxyethanol adipate, di(octyldiglycol)adipate, di(octylpolyglycol)adipate, ethylene glycol benzoate, diethylene glycol dibenzoate, polyethylene glycol dibenzoate, propylene glycol dibenzoate, dipropylene glycol dibenzoate, tripropylene glycol dibenzoate, 1,3-butanediol dibenzoate, 1,4-butanediol dibenzoate, 1,6-hexanediol dibenzoate, 3-methyl-1,5-pentanediol dibenzoate, 1,8-octanediol dibenzoate, EP-400 (trade name; manufactured by Sanyo Chemical Industries, Ltd.), and polyester-based plasticizers in which both terminals of its basic structure that is a condensate of a polybasic acid and a polyhydric alcohol are terminated by a monohydric alcohol or a monobasic acid.

As the above-described polybasic acid, any polybasic acid known as a monomer for polyester can be used. Examples thereof include aromatic carboxylic acids such as terephthalic acid, isophthalic acid, trimellitic acid, pyromellitic acid and naphthalene dicarboxylic acid; aliphatic carboxylic acids such as maleic acid, fumaric acid, succinic acid, alkenyl succinic acid and adipic acid; methyl ester compounds of these polybasic acids; and anhydrides thereof. These polybasic acids may be used individually, or two or more thereof may be used in combination.

As the above-described polyhydric alcohol, any polyhydric alcohol known as a monomer for polyester can be used, and examples thereof include aliphatic polyhydric alcohols having 2 to 18 carbon atoms, such as ethylene glycol, 1,2-propylene glycol, 1,3-propylene glycol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol-1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol and glycerin; alicyclic polyhydric alcohols such as cyclohexane diol, cyclohexane dimethanol and hydrogenated bisphenol A; and aromatic diols such as ethylene oxide adduct of bisphenol A and propylene oxide adduct of bisphenol A. These polyhydric alcohols may be used individually, or two or more thereof may be used in combination.

Specific examples of the above-described monohydric alcohol include aliphatic alcohols having 8 to 18 carbon atoms, such as octanol, isooctanol, 2-ethylhexanol, nonanol, isononanol, 2-methyloctanol, decanol, isodecanol, undecanol, dodecanol, tridecanol, tetradecanol, hexadecanol and octadecanol; alicyclic alcohols such as cyclohexanol; and aromatic alcohols such as benzyl alcohol, 2-phenylethanol, 1-phenylethanol, 2-phenoxyethanol, 3-phenyl-1-propanol and 2-hydroxyethyl benzyl ether. These monohydric alcohols may be used individually, or two or more thereof may be used in combination.

Specific examples of the above-described monobasic acid include monocarboxylic acids such as caprylic acid, nonanoic acid, capric acid, undecylic acid and laurylic acid; monoesters of dicarboxylic acids; and diesters of tricarboxylic acids. These monobasic acids may be used individually, or two or more thereof may be used in combination.

Examples of plasticizers other than those described above include alicyclic ester-based plasticizers, and example thereof include cyclohexane dicarboxylates, cyclohexane dicarboxylates having an epoxy group, and cyclohexane carboxylic anhydrides such as 1,2-cyclohexane dicarboxylic anhydride.

Examples of yet other plasticizers include phthalate-based plasticizers such as ethylbenzyl phthalate, butylbenzyl phthalate, isobutylbenzyl phthalate, heptylbenzyl phthalate, (2-ethylhexyl)benzyl phthalate, n-octylbenzyl phthalate, nonylbenzyl phthalate, isononylbenzyl phthalate, isodecylbenzyl phthalate, undecylbenzyl phthalate, tridecylbenzyl phthalate, cyclohexylbenzyl phthalate, benzyl-3-(isobutyryloxy)-1-isopropyl-2,2-dimethylpropyl phthalate, myristylbenzyl phthalate, dibutyl phthalate, diisobutyl phthalate, diheptyl phthalate, di-(2-ethylhexyl)phthalate, di-n-octyl phthalate, dinonyl phthalate, diisononyl phthalate, diisodecyl phthalate, diundecyl phthalate, ditridecyl phthalate, dicyclohexyl phthalate and diphenyl phthalate; isophthalates such as di-(2-ethylhexyl)isophthalate and diisooctyl isophthalate; tetrahydrophthalates such as di-2-ethylhexyl tetrahydrophthalate; adipates such as di-(2-ethylhexyl)adipate, dibutoxyethyl adipate and diisononyl adipate; azelates such as di-n-hexyl azelate and di-(2-ethylhexyl)azelate; sebacates such as di-n-butyl sebacate; maleates such as di-n-butyl maleate and di-(2-ethylhexyl)maleate; fumarates such as di-n-butyl fumarate and di-(2-ethylhexyl)fumarate; trimellitates such as tri-(2-ethylhexyl)trimellitate, tri-n-octyl trimellitate and triisooctyl trimellitate; pyromellitates such as tetra-(2-ethylhexyl)pyromellitate and tetra-n-octyl pyromellitate; citrates such as tri-n-butyl citrate and acetyltributyl citrate; itaconates such as dimethyl itaconate, diethyl itaconate, dibutyl itaconate and di-(2-ethylhexyl)itaconate; ricinoleic acid derivatives such as glyceryl monoricinoleate and diethylene glycol monoricinoleate; stearates such as glycerin monostearate and diethylene glycol distearate; other fatty acid esters such as diethylene glycol dipelargonate and pentaerythritol fatty acid esters; and phosphates such as tributoxyethyl phosphate, triphenyl phosphate, tricresyl phosphate, diphenyldecyl phosphate and diphenyloctyl phosphate. The above-described other plasticizers may be used individually, or two or more thereof may be used in combination.

As a plasticizer(s) to be used in the masterbatch according to the present invention, for example, a polyether ester-based plasticizer and/or a benzoic acid ester-based plasticizer that improve the moldability of the polyester resin as well as the shrinkage anisotropy, surface properties and the like of the resulting molded article can be preferably used.

Examples of the above-described filler include those fillers that impart the resulting molded article with rigidity such as mechanical strength, allow the resulting molded article to be hardly anisotropic and have little warpage, and control the fluidity of the polyester resin composition during melt-processing.

Specific examples of such fillers include talc, mica, calcium carbonate, calcium oxide, calcium hydroxide, magnesium carbonate, magnesium hydroxide, magnesium oxide, magnesium sulfate, aluminum hydroxide, barium sulfate, glass powder, glass fibers, clays, dolomite, mica, silica, alumina, potassium titanate whiskers, wollastonite and fibrous magnesium oxysulfate. Thereamong, fillers having an average particle size (in the case of a spherical or plate-form filler) or an average fiber diameter (in the case of a needle-form or fibrous filler) of 5 μm or less are preferred.

For the purpose of imparting the resulting molded article with rigidity such as mechanical strength, a fibrous inorganic filler is preferably used and a glass fiber is particularly preferred. Further, in order to obtain a molded article showing limited anisotropy and warping, a plate-form filler is preferably used and, for example, mica or glass flake is particularly preferably used. Moreover, a particulate filler is also preferably used for adjusting the fluidity of the polyester resin composition during the production of a molded article.

The above-described filler may also be treated in advance with a surface treatment agent in order to improve its affinity and adhesion at the interface with the polyester resin. As the surface treatment agent, for example, an aminosilane compound or a surface treatment agent containing at least one epoxy resin is preferably used.

Examples of the above-described aminosilane compound include γ-aminopropyl triethoxysilane, γ-aminopropyl trimethoxysilane and γ-(2-aminoethyl)aminopropyl trimethoxysilane.

Examples of the epoxy resin contained in the above-described surface treatment agent include novolac-type epoxy resins and bisphenol-type epoxy resins, and a novolac-type epoxy resin is preferably used. Examples of the novolac-type epoxy resin include polyfunctional epoxy resins such as phenol novolac-type epoxy resins and cresol novolac-type epoxy resins.

Further, in the surface treatment agent, in addition to the above-described aminosilane compound and epoxy resin, a component(s) such as a urethane resin, an acrylic resin, an antistatic agent, a lubricant and/or a water repellent may also be incorporated in such an amount that does not adversely affect the properties of the surface treatment agent. Further, examples of other surface treatment agent include non-novolac-type and non-bisphenol-type epoxy resins, and coupling agents.

Examples of the above-described phenolic antioxidant include 2,6-di-tert-butyl-4-ethylphenol, 2-tert-butyl-4,6-dimethylphenol, styrenated phenol, 2,2'-methylenebis(4-ethyl-6-tert-butylphenol), 2,2'-thiobis-(6-tert-butyl-4-methylphenol), 2,2'-thiodiethylenebis[3-(3,5-di-tert-butyl-4-hydroxyphenyl)propionate], 2-methyl-4,6-bis(octylsulfanylmethyl)phenol, 2,2'-isobutylidenebis(4,6-dimethylphenol), iso-octyl-3-(3,5-di-tert-butyl-4-hydroxyphenyl)propionate, N,N'-hexane-1,6-diylbis[3-(3,5-di-tert-butyl-4-hydroxyphenyl)propionamide, 2,2'-oxamidebis[ethyl-3-(3,5-di-tert-butyl-4-hydroxyphenyl)propionate], 2-ethylhexyl-3-(3',5'-di-tert-butyl-4'-hydroxyphenyl)propionate, 2,2'-ethylenebis(4,6-di-tert-butylphenol), 3,5-bis(1,1-dimethylethyl)-4-hydroxy-benzenepropanoate, C13-15 alkyl esters, 2,5-di-tert-amylhydroquinone, hindered phenol polymer (AO.OH998, manufactured by ADEKA Palmarole SAS), 2,2'-methylenebis[6-(1-methylcyclohexyl)-p-cresol], 2-tert-butyl-6-(3-tert-butyl-2-hydroxy-5-methylbenzyl)-4-methylphenyl acrylate, 2-[1-(2-hydroxy-3,5-di-tert-pentylphenyl)ethyl]-4,6-di-tert-pentylphenyl acrylate, 6-[3-(3-tert-butyl-4-hydroxy-5-methyl)propoxy]-2,4,8,10-tetra-tert-butylbenzo[d,f][1,3,2]-dioxaphosphepin, hexamethylenebis[3-(3,5-di-tert-butyl-4-hydroxyphenyl)propionate, calcium bis[monoethyl(3,5-di-tert-butyl-4-hydroxybenzyl)phosphonate, a reaction product between 5,7-bis(1,1-dimethylethyl)-3-hydroxy-2(3H)-benzofuranone and o-xylene, 2,6-di-tert-butyl-4-(4,6-bis(octylthio)-1,3,5-triazine-2-ylamino)phenol, DL-a-tocophenol (vitamin E), 2,6-bis(α-methylbenzyl)-4-methylphenol, bis[3,3-bis-(4'-hydroxy-3'-tert-butyl-phenyl) butyric acid]glycol ester, 2,6-di-tert-butyl-p-cresol, 2,6-diphenyl-4-octadecyloxyphenol, stearyl(3,5-di-tert-butyl-4- hydroxyphenyl)propionate, distearyl(3,5-di-tert-butyl-4-hydroxybenzyl)phosphonate, tridecyl-3,5-di-tert-butyl-4-hydroxybenzyl thioacetate, thiodiethylenebis[(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylenebis(4-methyl-6-tert-butylphenol), bis[3,3-bis(4-hydroxy-3-tert-butylphenyl) butyric acid]glycol ester, 4,4'-butylidenebis(2,6-di-tert-butylphenol), 4,4'-butylidenebis(6-tert-butyl-3-methylphenol), 2,2'-ethylidenebis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl) propionyloxyethyl]isocyanurate, tetrakis[methylene-3-(3',5'-di-tert-butyl-4'-hydroxyphenyl)propionate]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5.5]undecane and triethylene glycol-bis[β-(3-tert-butyl-4-hydroxy-5-methylphenyl)propionate].

Examples of the above-described phosphorus-based antioxidant include triphenyl phosphite, diisooctyl phosphite, heptakis triphosphite, triisodecyl phosphite, diphenyl isooctyl phosphite, diisooctyl octylphenyl phosphite, diphenyl tridecyl phosphite, triisooctyl phosphite, trilauryl phosphite, diphenyl phosphite, tris(dipropylene glycol)phosphite, diisodecyl pentaerythritol diphosphite, dioleyl hydrogen phosphite, trilauryl trithiophosphite, bis(tridecyl)phosphite, tris (isodecyl)phosphite, tris(tridecyl)phosphite, diphenyldecyl phosphite, dinonylphenyl-bis(nonylphenyl)phosphite, poly (dipropylene glycol)phenyl phosphite, tetraphenyldipropyl glycol diphosphite, trisnonylphenyl phosphite, tris(2,4-di-tert-butylphenyl)phosphite, tris(2,4-di-tert-butyl-5-methylphenyl)phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, distearyl pentaerythritol diphosphite, a mixture of distearyl pentaerythritol and calcium stearate, alkyl(C10) bisphenol-A phosphite, di(tridecyl)pentaerythritol diphosphite, di(nonylphenyl)pentaerythritol diphosphite, bis(2,4-di-tert-butylphenyl)pentaerythritol diphosphite, bis (2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetraphenyl-tetra(tridecyl)pentaerythritol tetraphosphite, bis (2,4-di-tert-butyl-6-methylphenyl)ethyl phosphite, tetra(tridecyl)isopropylidene diphenol diphosphite, tetra(tridecyl)-4,4'-n-butylidenebis(2-tert-butyl-5-methylphenol) diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, (1-methyl-1-propanyl-3-ylidene)-tris(2-1,1-dimethylethyl)-5-methyl-4, 1-phenylene)hexatridecyl phosphite, 2,2'-methylenebis(4,6-tert-butylphenyl)-2-ethylhexyl phosphite, 2,2'-methylenebis (4,6-di-tert-butylphenyl)-octadecyl phosphite, 2,2'-ethylidenebis(4,6-di-tert-butylphenyl)fluorophosphite, 4,4'-butylidenebis(3-methyl-6-tert-butylphenylditridecyl) phosphite, tris(2-[(2,4,8,10-tetrakis-tert-butyldibenzo[d,f] [1,3,2]dioxaphosphepin-6-yl)oxy]ethyl)amine, 3,9-bis(4-nonylphenoxy)-2,4,8,10-tetraoxa-3,9-diphosphaspiro[5,5] undecane, 2,4,6-tri-tert-butylphenyl-2-butyl-2-ethyl-1,3-propanediol phosphite, poly-4,4'-isopropylidene diphenol C12-15 alcohol phosphite, and phosphite of 2-ethyl-2-butylpropylene glycol and 2,4,6-tri-tert-butylphenol.

Examples of the above-described thioether-based antioxidant include tetrakis[methylene-3-(laurylthio)propionate] methane, bis(methyl-4-[3-n-alkyl(C12/C14)thiopropionyloxy]5-tert-butylphenyl)sulfide, ditridecyl-3,3'-thiodipropionate, dilauryl-3,3'-thiodipropionate, dimyristyl-3,3'-thiodipropionate, distearyl-3,3'-thiodipropionate, lauryl/stearyl thiodipropionate, 4,4'-thiobis(6-tert-butyl-m-cresol), 2,2'-thiobis(6-tert-butyl-p-cresol) and distearyl-disulfide.

Examples of the above-described ultraviolet absorber include 2-hydroxybenzophenones such as 2,4-dihydroxybenzophenone, 2-hydroxy-4-methoxybenzophenone, 2-hydroxy-4-octoxybenzophenone and 5,5'-methylenebis(2-hydroxy-4-methoxybenzophenone); 2-(2-hydroxyphenyl) benzotriazoles such as 2-(2-hydroxy-5-methylphenyl) benzotriazole, 2-(2-hydroxy-5-tert-octylphenyl) benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylenebis(4-tert-octyl-6-benzotriazolylphenol), polyethylene glycol ester of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl] benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyephenyl]benzotriazole, 2-[2-hydroxy-4-(3-methacryloyloxy-2-hydroxypropyl)phenyl] benzotriazole and 2-[2-hydroxy-4-(3-methacryloyloxypropyl)phenyl]benzotriazole; 2-(2-hydroxyphenyl)-4,6-diaryl-1,3,5-triazines such as 2-(2-hydroxy-4-methoxyphenyl)-4,6-diphenyl-1,3,5-triazine, 2-(2-hydroxy-4-hexyloxyphenyl)-4,6-diphenyl-1,3,5-triazine, 2-(2-hydroxy-4-octoxyphenyl)-4,6-bis(2,4-dimethylphenyl)-1,3,5-triazine, 2-[2-hydroxy-4-(3-C12 to 13 mixed alkoxy-2-hydroxypropoxy)phenyl]-4,6-bis(2,4-dimethylphenyl)-1,3,5-triazine, 2-[2-hydroxy-4-(2-acryloyloxyethoxy)phenyl]-4,6-bis(4-methylphenyl)-1,3,5-triazine, 2-(2,4-dihydroxy-3-allylphenyl)-4,6-bis(2,4-dimethylphenyl)-1,3,5-triazine and 2,4,6-tris(2-hydroxy-3-methyl-4-hexyloxyphenyl)-1,3,5-triazine; benzoates such as phenyl salicylate, resorcinol monobenzoate, 2,4-di-tert-butylphenyl-3,5-di-tert-butyl-4-hydroxybenzoate, octyl(3,5-di-tert-butyl-4-hydroxy)benzoate, dodecyl(3,5-di-tert-butyl-4-hydroxy)benzoate, tetradecyl(3,5-di-tert-butyl-4-hydroxy) benzoate, hexadecyl(3,5-di-tert-butyl-4-hydroxy)benzoate, octadecyl(3,5-di-tert-butyl-4-hydroxy)benzoate and behenyl (3,5-di-tert-butyl-4-hydroxy)benzoate; substituted oxanilides such as 2-ethyl-2'-ethoxyoxanilide and 2-ethoxy-4'-dodecyloxanilide; cyanoacrylates such as ethyl-α-cyano-β,β-diphenyl acrylate and methyl-2-cyano-3-methyl-3-(p-methoxyphenyl)acrylate; and various metal salts and metal chelates, particularly salts and chelates of nickel and chromium.

Examples of the above-described hindered amine compound include 2,2,6,6-tetramethyl-4-piperidyl stearate, 1,2,2,6,6-pentamethyl-4-piperidyl stearate, 2,2,6,6-tetramethyl- 4-piperidyl benzoate, bis(2,2,6,6-tetramethyl-4-piperidyl) sebacate, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, bis(2,2,6,6-tetramethyl-4-piperidyl).di(tridecyl)-1,2,3,4-butane tetracarboxylate, bis(1,2,2,6,6-pentamethyl-4-piperidyl).di(tridecyl)-1,2,3,4-butane tetracarboxylate, bis(1,2,2,4,4-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8-12-tetraazadodecane, 1,6,11-tris[2,4-bis(N-butyl-N-(2,2,6,6-tetramethyl-4-piperidyl)amino)-s-triazine-6-yl]aminoundecane, 1,6,11-tris[2,4-bis(N-butyl-N-(1,2,2,6,6-pentamethyl-4-piperidyl)amino)-s-triazine-6-yl]aminoundecane, bis{4-(1-octyloxy-2,2,6,6-tetramethyl)piperidyl}decanedionate and bis{4-(2,2,6,6-tetramethyl-1-undecyloxy)piperidyl}carbonate.

Among these hindered amine compounds, ones in which the group bound at the 1-position of piperidine is N-oxyalkyl or N-methyl are preferred.

Examples of the above-described flame retardant include aromatic phosphates such as triphenyl phosphate, tricresyl phosphate, trixylenyl phosphate, cresyldiphenyl phosphate, cresyl-2,6-xylenyl phosphate and resorcinol bis(diphenyl-phosphate); phosphonates such as divinyl phenylphosphonate, diallyl phenylphosphonate and (1-butenyl)phenylphosphonate; phosphinates such as phenyl diphenylphosphinate, methyl diphenylphosphinate and 9,10-dihydro-9-oxa-10-phosphaphenanthlene-10-oxide derivatives; phosphazene compounds such as bis(2-allylphenoxy)phosphazene and dicresylphosphazene; phosphorus-based flame retardants such as melamine phosphate, melamine pyrophosphate, melamine polyphosphate, melam polyphosphate, ammonium polyphosphate, phosphorus-containing vinylbenzyl compounds and red phosphorus; metal hydroxides such as magnesium hydroxide and aluminum hydroxide; and bromine-based flame retardants such as brominated bisphenol A-type epoxy resin, brominated phenol novolac-type epoxy resin, hexabromobenzene, pentabromotoluene, ethylenebis(pentabromophenyl), ethylenebis-tetrabromophthalimide, 1,2-dibromo-4-(1,2-dibromoethyl)cyclohexane, tetrabromocyclooctane, hexabromocyclododecane, bis(tribromophenoxy)ethane, brominated polyphenylene ether, brominated polystyrene, 2,4,6-tris(tribromophenoxy)-1,3,5-triazine, tribromophenyl maleimide, tribromophenyl acrylate, tribromophenyl methacrylate, tetrabromo bisphenol A-type dimethacrylate, pentabromobenzyl acrylate and brominated styrene.

The above-described lubricant is added for the purpose of imparting the surface of the resulting molded article with lubricity and improving the damage-preventing effect. Examples of such lubricant include unsaturated fatty acid amides such as oleic acid amide and erucic acid amide; and saturated fatty acid amides such as behenic acid amide and stearic acid amide. These lubricants may be used individually, or two or more thereof may be used in combination.

The above-described antistatic agent is added for the purpose of reducing the electrostatic property of the resulting molded article and preventing adhesion of dusts caused by electrostatic charge. Examples of such antistatic agent include cationic, anionic and non-ionic antistatic agents. Preferred examples thereof include polyoxyethylene alkylamines, polyoxyethylene alkylamides, fatty acid esters thereof, and glycerin fatty acid esters. These antistatic agents may be used individually, or two or more thereof may be used in combination.

Further, in the production method according to the present invention, a mold-release agent may be blended. As the mold-release agent, one which improves the releasing property of the resulting molded article from a mold and allows the molded article to be released even from a mold with a cavity having a reverse-tapered surface is preferred. Specific examples of such mold-release agent include polyethylene-based waxes and low-molecular-weight polypropylenes, and these may be used individually, or two or more thereof may be used in combination. Here, the term "polyethylene-based waxes" refers to low-molecular-weight polyethylenes having a molecular weight of about 500 to 10,000.

In the present invention, the amount of the additive(s) used in the polyester resin is preferably in the range of from an amount that allows the effects of the additive(s) to be exerted to an amount that an improvement in the effects of the addition is no longer observed. The preferred amounts of the respective additives to be used in 100 parts by mass of the polyester resin are as follows: 0.1 to 20 parts by mass of plasticizer, 1 to 50 parts by mass of filler, 0.001 to 1 part by mass of surface treatment agent, 0.001 to 10 parts by mass of phenolic antioxidant, 0.001 to 10 parts by mass of phosphorus-based antioxidant, 0.001 to 10 parts by mass of thioether-based antioxidant, 0.001 to 5 parts by mass of ultraviolet absorber, 0.01 to 1 part by mass of hindered amine compound, 1 to 50 parts by mass of flame retardant, 0.03 to 2 parts by mass of lubricant, 0.03 to 2 parts by mass of antistatic agent, and 0.1 to 1 part by mass of mold-release agent. It is noted here that the above-described amounts represent the final amounts of the respective additives contained in a molded article obtained by molding a masterbatch prepared by the production method according to the present invention, not the amounts of the respective additives blended in the masterbatch.

The masterbatch according to the present invention is characterized in that it is obtained by the above-described production method of the present invention and has an intrinsic viscosity of not less than 0.25. The intrinsic viscosity can be measured and calculated by the below-described method and equation. By controlling the intrinsic viscosity to be not less than 0.25, after the melt-molding operation, a strand can be discharged stably from the extruder, so that a pellet having a uniform shape can be obtained.

The molded article according to the present invention is obtained by adding a masterbatch obtained by the production method of the present invention to a polyester resin and molding the resulting mixture by a known molding method such as extrusion molding, injection molding, hollow molding, blow molding or compression molding. The molded article according to the present invention can be used in, for example, food containers; cosmetic and clothing containers; bottles such as food bottles, beverage bottles, cooking oil bottles and seasoning bottles; packaging materials such as food packaging materials, wrapping materials and transport packaging materials; sheets and films, such as protection films of electronic materials and protection sheets of electric appliances; fibers; miscellaneous daily goods; and toys.

EXAMPLES

The present invention will now be described more concretely by way of production examples, examples and comparative examples thereof; however, the present invention is not restricted thereto by any means.

Production Example 1

Examples 1 to 11, Comparative Examples 2 to 8

Polyethylene terephthalate (PET; trade name "MA-2103" manufactured by UNITIKA Ltd., melting point: 264° C.) and the metal salt compound shown in Table 1 or 2 were mixed and the resulting mixture was fed to a biaxial extruder (apparatus: TEX28V, manufactured by The Japan Steel Works, LTD.; screw speed: 200 rpm) to perform the first step of melt-kneading the polyester resin and the metal salt compound. Then, while continuing the melt-kneading at the processing temperature shown in Table 1 or 2, the above-described polyethylene terephthalate in the amount shown in Table 1 or 2 was forced to be further fed to the biaxial extruder using a side feeder at the processing temperature shown in Table 1 or 2. The thus fed materials were melt-kneaded to obtain a pellet.

Comparative Example 1

A pellet was obtained under the conditions shown in the table below in the same manner as in Production Example 1, except that the side feeder was not used.

For the pellets obtained in the above-described Examples and Comparative Examples, the following evaluations were performed.

(I) Moldability

The moldability of each kneaded product of the polyester resin and metal salt compound that was discharged from the extruder was evaluated as follows: an evaluation of "○" was assigned when a strand was drawn; and an evaluation of "x" was assigned when a strand could not be drawn. Particularly, when the drawn strand was not broken even after being extruded for a period of over 1 hour, an evaluation of "⊙" was assigned. The evaluation results are shown in Tables 1 and 2.

(II) Intrinsic Viscosity (IV)

The pellets obtained by the above-described production method were each cooled on dry ice and then pulverized into a powder form. To 50 ml of a mixed solvent of phenol and 1,1,2,2-tetrachloroethane (6:4 (mass ratio)), 200 mg of the powdered pellet was added, and the resulting mixture was heated in a 100° C. oil bath until the pellet powder was completely dissolved. Thereafter, in a 25° C. water bath, the falling time was measured using an Ubbelohde viscometer, and the κ value (which is unique to each polymer and a measure of average polymerization degree) was calculated using the following equation (1) to determine the intrinsic viscosity $[\eta]_\kappa$ by the following equation (2). The results of calculating the intrinsic viscosity $[\eta]_\kappa$ are shown in Tables 1 and 2.

$$\kappa = \frac{1.5 \log\eta_r - 1 + \sqrt{1 + \left(\frac{2}{c} + 2 + 1.5 \log\eta_r\right)1.5 \log\eta_r}}{150 + 300c} \quad (1)$$

C: Concentration [g/cm$^3$]

$$\eta_r = \frac{t}{t_0}$$

t: Falling time of the test solution in the viscometer $t_0$: Falling time of the solvent alone (blank) in the viscometer $$[\eta]_\kappa = 230.3(75\kappa^2 + \kappa) \quad (2)$$

(III) Outer Appearance of Pellet

For each of the pellets obtained by the above-described production method, the outer appearance was examined. The outer appearance was evaluated as follows: an evaluation of "○" was assigned when the pellet had a uniform shape; and an evaluation of "x" was assigned when the pellet was broken into a powder form when pelletized. The evaluation results are shown in Tables 1 and 2.

(IV) Color Tone of Pellet

For each of the pellets obtained by the above-described production method, the color tone was visually examined. The color tone was evaluated as follows: an evaluation of "○" was assigned when the pellet was colored only to pale yellow; and an evaluation of "x" was assigned when prominent coloration to yellow, orange, brown or the like was observed.

TABLE 1

| | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Processing conditions of the first step | Metal salt compound [parts by mass] | | | | | | | | | | | |
| | Compound 1[1)] | 10 | | | | 10 | 10 | 20 | 6.7 | | | 10 |
| | Compound 2[2)] | | 10 | | 10 | | | | | 10 | | |
| | Compound 3[3)] | | | 10 | | | | | | | 10 | |
| | Polyester resin [parts by mass] | | | | | | | | | | | |
| | Polyethylene terephthalate | 10 | 20 | 23.3 | 30 | 40 | 90 | 10 | 13.3 | 10 | 10 | 10 |
| | Metal salt compound/ polyester resin (mass ratio) | 1 | 0.50 | 0.42 | 0.33 | 0.25 | 0.11 | 2 | 0.50 | 1 | 1 | 1 |
| | Processing temperature in the first step [° C.] | 330 | 320 | 320 | 300 | 310 | 290 | 330 | 310 | 330 | 340 | 330 |
| Processing conditions of the second step | Polyester resin [parts by mass] | | | | | | | | | | | |
| | Polyethylene terephthalate | 80 | 70 | 66.6 | 60 | 50 | 400 | 70 | 80 | 80 | 80 | 180 |
| | Dilution factor[4)] | 5 | 3.33 | 3 | 2.5 | 2 | 5 | 3.33 | 5 | 5 | 5 | 10 |
| | Processing temperature in the second step [° C.] | 280 | 280 | 280 | 280 | 280 | 280 | 280 | 280 | 280 | 280 | 280 |
| Masterbatch concentration[5)] [%] | | 10 | 10 | 10 | 10 | 10 | 2 | 20 | 6.7 | 10 | 10 | 5 |
| Evaluation results | Moldability | ⊙ | ○ | ○ | ○ | ○ | ⊙ | ○ | ⊙ | ⊙ | ⊙ | ⊙ |
| | Intrinsic viscosity (IV) | 0.41 | 0.35 | 0.34 | 0.30 | 0.28 | 0.51 | 0.31 | 0.44 | 0.41 | 0.42 | 0.49 |

TABLE 1-continued

|  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Pellet outer appearance | ◯ | ◯ | ◯ | ◯ | ◯ | ◯ | ◯ | ◯ | ◯ | ◯ | ◯ |
| Pellet color tone | ◯ | ◯ | ◯ | ◯ | ◯ | ◯ | ◯ | ◯ | ◯ | ◯ | ◯ |

[1] Compound 1: sodium 1,2-benzisothiazol-3(2H)-one-1,1-dioxide
[2] Compound 2: sodium benzoate
[3] Compound 3: LICOMONT NaV101, manufactured by Clariant (main component: calcium montanate)
[4] Dilution factor: (Total amount of polyester resin and metal salt compound that were fed in the first and second steps)/(Total amount of polyester resin and metal salt compound that were fed in the first step)
[5] Masterbatch concentration [%]: (Amount of metal salt compound that was fed)/(Total amount of polyester resin and metal salt compound that were fed in the first and second steps)

TABLE 2

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Processing conditions of the first step | Metal salt compound [parts by mass] |  |  |  |  |  |  |  |  |
|  | Compound 1[1] | 10 | 10 |  |  | 10 | 40 |  | 10 |
|  | Compound 2[2] |  |  | 10 | 10 |  |  |  |  |
|  | Compound 3[3] |  |  |  |  |  |  | 15 |  |
|  | Polyester resin [parts by mass] |  |  |  |  |  |  |  |  |
|  | Polyethylene terephthalate | 90 | 56.7 | 10 | 10 | 10 | 20 | 5 | 10 |
|  | Metal salt compound/polyester resin (mass ratio) | 0.11 | 0.18 | 1 | 1 | 1 | 2 | 3 | 1 |
|  | Processing temperature in the first step [° C.] | 310 | 300 | 280 | 360 | 270 | 330 | 330 | 330 |
| Processing conditions of the second step | Polyester resin [parts by mass] |  |  |  |  |  |  |  |  |
|  | Polyethylene terephthalate | 0 | 23.3 | 80 | 80 | 80 | 40 | 80 | 80 |
|  | Dilution factor[4] | 0 | 1.5 | 5 | 5 | 5 | 1.67 | 5 | 5 |
|  | Processing temperature in the second step [° C.] | 280 | 280 | 280 | 280 | 280 | 280 | 280 | 330 |
| Masterbatch concentration[5] [%] |  | 10 | 10 | 10 | 10 | 10 | 40 | 15 | 10 |
| Evaluation results | Moldability | X | X | X | ◯ | X | X | X | ◯ |
|  | Intrinsic viscosity (IV) | 0.20 | 0.23 | 0.23 | 0.33 | 0.22 | 0.17 | 0.14 | 0.31 |
|  | Pellet outer appearance | X | X | X | ◯ | X | X | X | ◯ |
|  | Pellet color tone | X | ◯ | ◯ | X | ◯ | X | ◯ | X |

From the above, it was confirmed that, by the production method of the present invention, a masterbatch having good moldability and little coloration can be produced even when the masterbatch contains a metal salt compound at a high concentration of 2 to 20% by mass.

The invention claimed is:

1. A method of producing a masterbatch in which a metal salt compound is incorporated into a polyester resin, said method comprising:
a first step of obtaining a kneaded product by feeding said polyester resin and said metal salt compound to an extruder and melt-kneading said polyester resin and said metal salt compound; and
a second step of, while continuing kneading after said first step, further feeding said polyester resin to said extruder and kneading the resulting mixture, wherein,
in said first step, said polyester resin and said metal salt compound are fed at such a mass ratio that the amount of said metal salt compound is not more than twice the amount of said polyester resin;
the total amount of said polyester resin fed in said first and second steps and said metal salt compound fed in said first step is, in terms of mass ratio, in the range of 2 to 20 times the total amount of said polyester resin and said metal salt compound that are fed in said first step;
the processing temperature in said first step is in the range of 20° C. to 80° C. higher than the melting point of said polyester resin; and
the processing temperature in said second step is in the range of 0° C. to 50° C. higher than the melting point of said polyester resin.

2. The method of producing a masterbatch according to claim 1, wherein said metal salt compound is at least one selected from the group consisting of metal benzoates, aliphatic metal carboxylates, metal salts of sulfonamide compounds and metal salts of sulfonimide compounds.

3. The method of producing a masterbatch according to claim 1, wherein said polyester resin is at least one selected from the group consisting of polyethylene terephthalate, polytrimethylene terephthalate, polybutylene terephthalate, polyethylene naphthalate and polybutylene naphthalate.

4. The method of producing a masterbatch according to claim 1, wherein, in said second step, said polyester is fed to said kneaded product obtained in said first step by a side feeder.

5. A method of producing a masterbatch in which a metal salt compound is incorporated into a polyester resin, said method comprising:
a first step of obtaining a kneaded product by feeding said polyester resin and said metal salt compound to an extruder and melt-kneading said polyester resin and said metal salt compound; and a second step of, while continuing kneading after said first step, further feeding said polyester resin to said extruder and kneading the resulting mixture, wherein:

said metal salt compound is at least one selected from the group consisting of metal benzoates, aliphatic metal carboxylates, metal salts of sulfonamide compounds and metal salts of sulfonimide compounds;

in said first step, said polyester resin and said metal salt compound are fed at such a mass ratio that the amount of said metal salt compound is not more than twice the amount of said polyester resin;

the total amount of said polyester resin fed in said first and second steps and said metal salt compound fed in said first step is, in terms of mass ratio, in the range of 2 to 20 times the total amount of said polyester resin and said metal salt compound that are fed in said first step;

the processing temperature in said first step is in the range of 20° C. to 80° C. higher than the melting point of said polyester resin; and the processing temperature in said second step is in the range of 0° C. to 50° C. higher than the melting point of said polyester resin.

* * * * *